United States Patent
Kopp, Jr.

[15] 3,640,074
[45] Feb. 8, 1972

[54] PROCESS FOR COLLECTING AND STORING FRESH WATER IN EARTH

[72] Inventor: Adolph Kopp, Jr., P.O. Box 137, Swan Lake, Mont. 59911

[22] Filed: Oct. 24, 1969

[21] Appl. No.: 871,417

Related U.S. Application Data

[63] Continuation-in-part of Ser. No. 560,921, June 23, 1966.

[52] U.S. Cl. .................................................................61/1 R
[51] Int. Cl. ...................................................E02b 3/02
[58] Field of Search ..........................61/.5, 1, 11, 36, 36 A; 62/260; 165/45; 202/235; 203/10, 11, 26

[56] References Cited

UNITED STATES PATENTS

| | | | |
|---|---|---|---|
| 907,441 | 12/1908 | Baur | 61/36 A |
| 1,878,295 | 9/1932 | Richmond | 61/10 |
| 3,221,505 | 12/1965 | Goodwin et al. | 61/36 |
| 3,234,109 | 2/1966 | Lustenader | 203/11 |
| 3,248,305 | 4/1966 | Williamson | 203/11 X |
| 3,299,651 | 1/1967 | McGrath | 203/11 X |
| 3,300,984 | 1/1967 | Armentrout | 61/1 |
| 3,323,309 | 6/1967 | Dobell | 61/11 |
| 3,354,656 | 11/1967 | Fahnestuck | 61/.5 X |

*Primary Examiner*—Peter M. Caun
*Attorney*—Wells, St. John & Roberts

[57] ABSTRACT

A thin water impermeable barrier is established in water permeable earth adjacent to the shore of a body of salt water and extended downward from the level of the high point of salt water intrusion into the water permeable earth to a nonwater-permeable earth layer. The barrier is extended laterally along the shore and upland from the shore to points where the nonwater-permeable earth layer is as high as said level, thus isolating an area of water permeable earth from the body of salt water. The salt water thus trapped in the water permeable earth is then extracted from the isolated water permeable earth by transferring it from the bottom part of the water permeable earth to the other side of the barrier. Fresh water is then stored in the isolated water permeable earth, thus establishing an available reservoir of fresh water. The barrier is formed and maintained by continuously circulating refrigerant downwardly from the level of the high point of salt water intrusion through a row of closely spaced holes to the nonwater-permeable earth layer. The heat extracted from the earth in forming and maintaining the barrier is employed to evaporate water from the salt water adjacent to the barrier and return the fresh water thus recovered to the reservoir.

6 Claims, 9 Drawing Figures

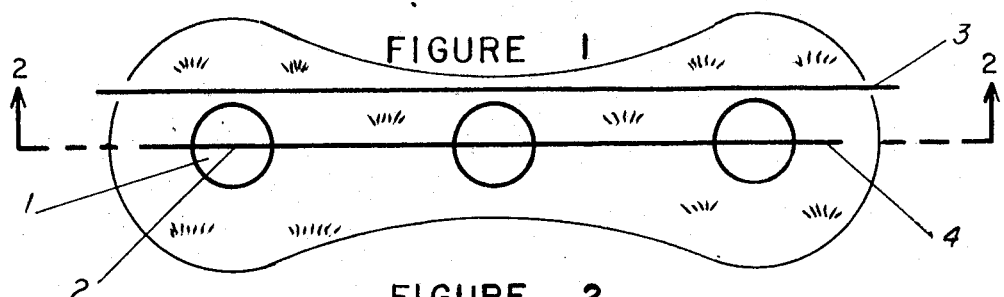
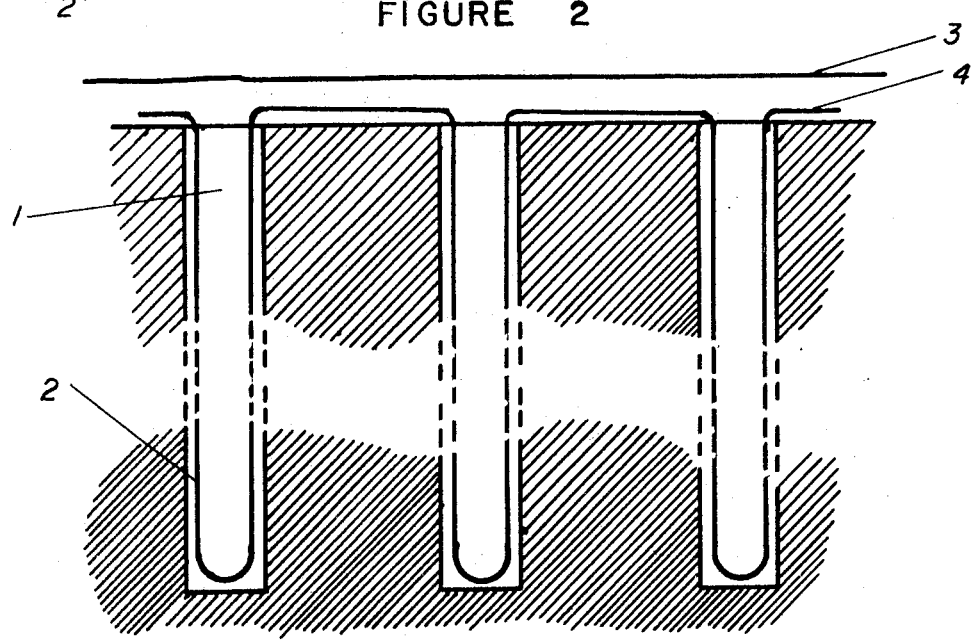
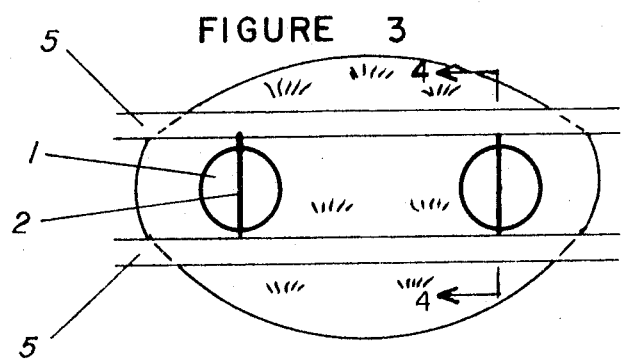

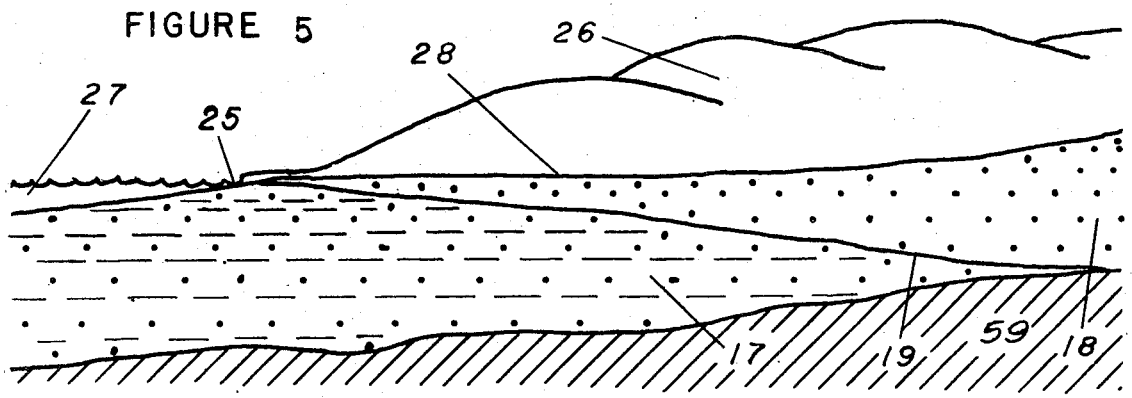
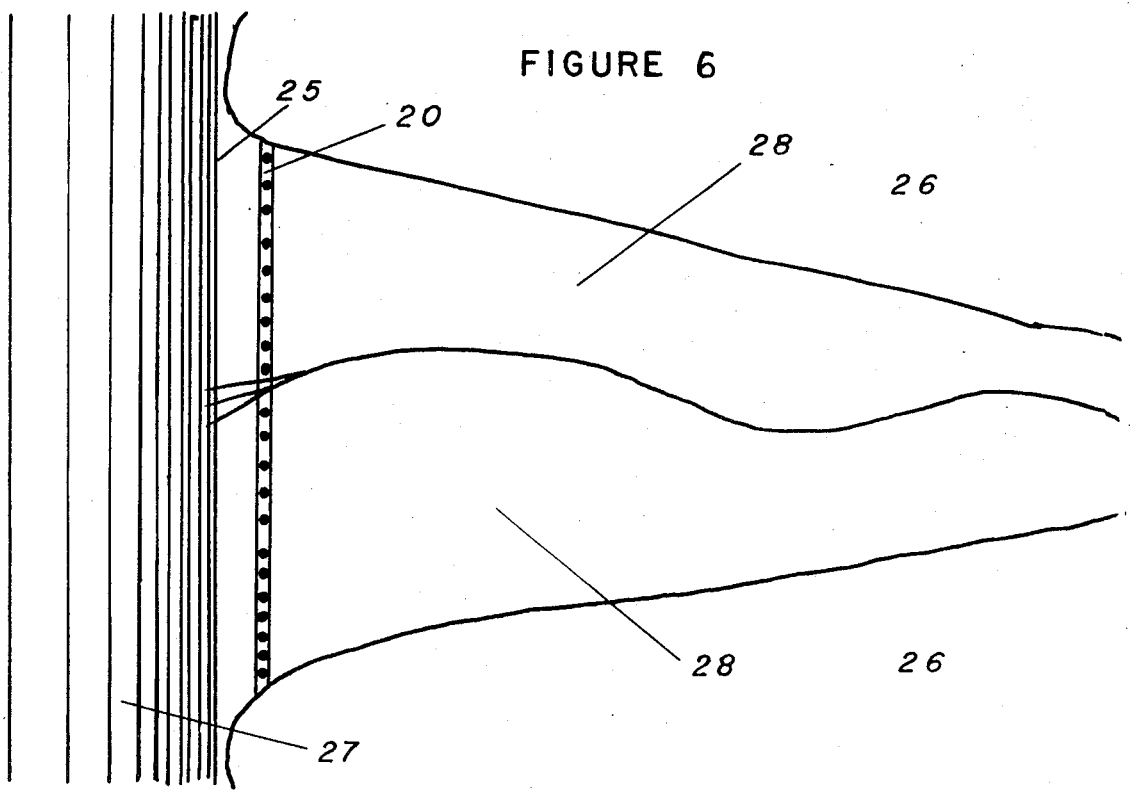
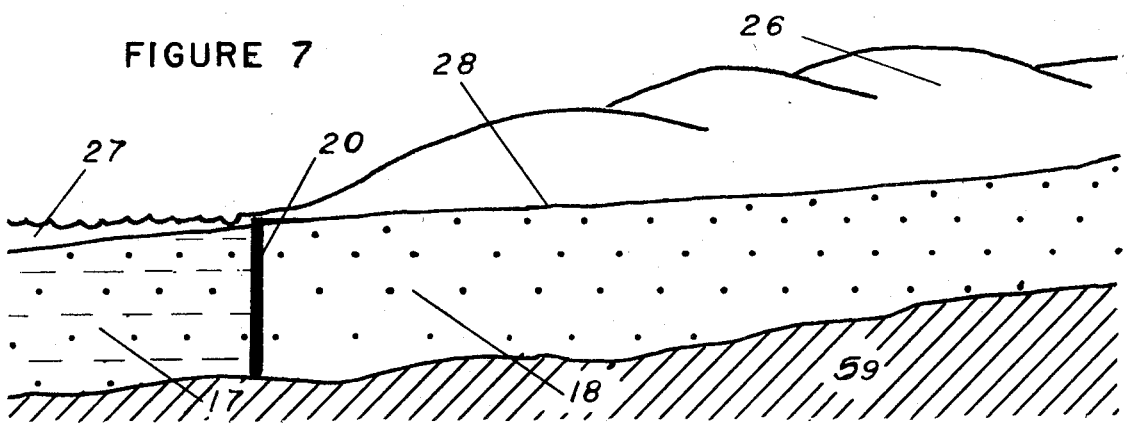

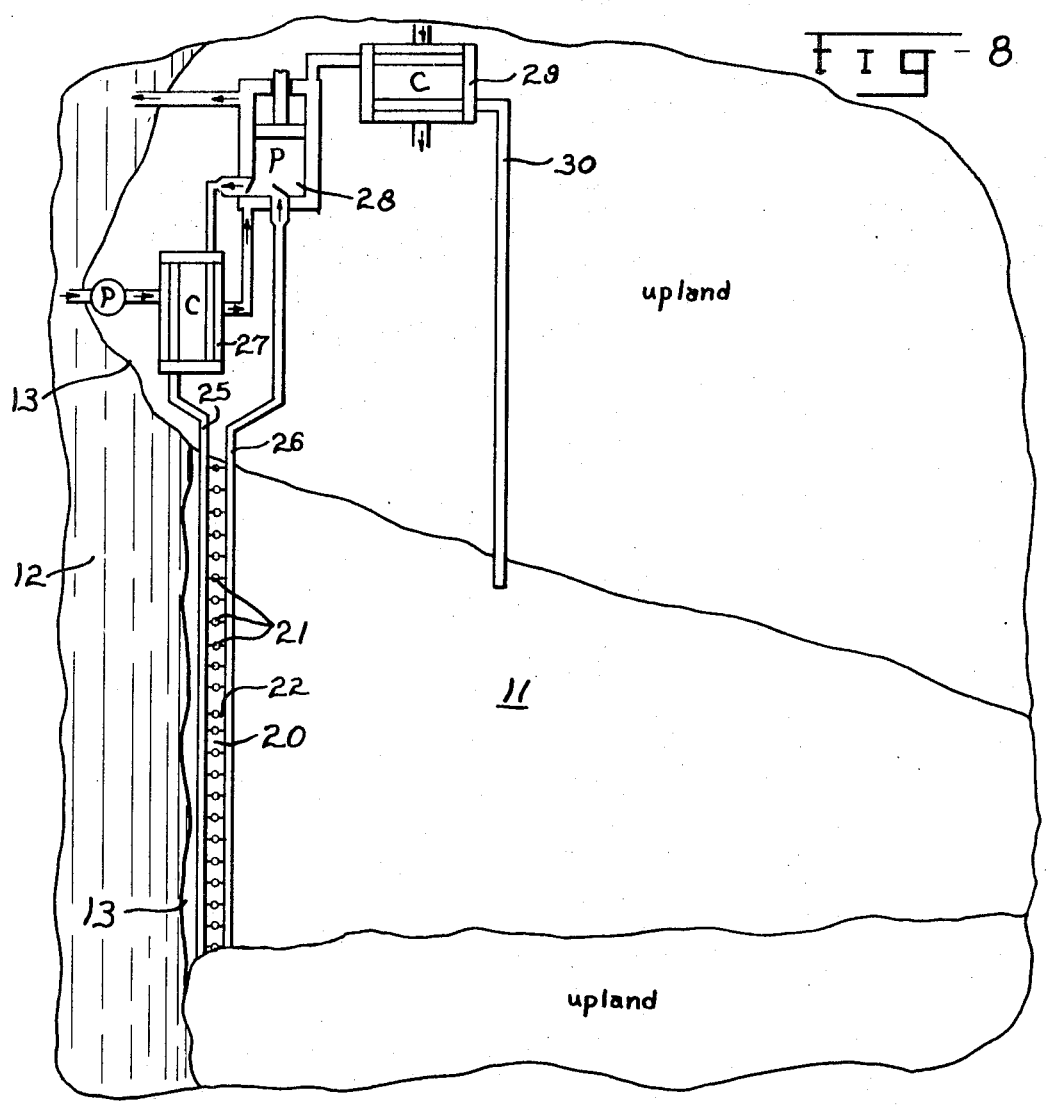

PROCESS FOR COLLECTING AND STORING FRESH WATER IN EARTH

BACKGROUND OF THE INVENTION

This application is a continuation in part of my application Ser. No. 560,921, filed June 23, 1966, for processes for creating fresh water reservoirs, etc.

It is well known that water filled, water permeable earth may be made into a water impervious wall by freezing a narrow thickness thereof to the vertical depth desired. The Chapin Shaft at Iron Mountain, Mich., was sunk some 95 feet in 1888-89 using a circular row of holes to define a circle of some 29 feet diameter and freezing water in the holes to the desired depth by circulating expanding ammonia downward to the desired depth. Various methods have been suggested as a means of establishing barriers in water permeable earth. More modern examples of such methods are found in the Dobell U.S. Pat. No. 3,323,309 where an area is enclosed by vertical walls over a salt water filled earth and fresh water is floated within the walls on top of the salt water in the same basic manner as the fresh water supply in parts of the state of Hawaii is held. The Goodwin U.S. Pat. No. 3,221,505 illustrates another manner of establishing an underground barrier. The concept of tapping an underground water permeable layer to recover water therein which is locked in by water impervious layers above and below is shown in the old Richmond U.S. Pat. No. 1,878,295.

PURPOSE OF THE INVENTION

It is the purpose of the present invention to provide a process by which areas adjacent to bodies of salt water, which areas are at present essentially short of fresh water supply, can be provided with fresh water reservoirs within the earth of such areas, and the reservoirs may be kept reasonably safe from destruction by earth tremors, enemy bombings and the like.

More specifically it is a purpose of this invention to provide a process whereby water permeable earth adjacent to bodies of salt water, and now generally so filled with the infiltrated salt water as to preclude any underground storage of fresh water, is isolated and emptied of salt water and then used for renewable fresh water storage out of contact with the salt water. There are many areas adjacent the shores of our land and adjacent to large centers of population where the present water supply to the people is from surface reservoirs some distance away and is readily subject to interruption and destruction by enemy attack and by earth tremors. The process hereinafter explained provides a way to assure capture of more of the available water before it is mingled with salt water and lost.

BRIEF DESCRIPTION OF DRAWINGS

FIG. 1 is a diagrammatic plan view of a portion of the water impermeable barrier;

FIG. 2 is a sectional view of the barrier taken on the line 2—2 of Fig. 1;

FIG. 3 is a diagrammatic plan view of a modified barrier forming system;

FIG. 4 is a sectional view on the line 4—4 of Fig. 3;

FIG. 8 is a view similar to Fig. 6 showing the utilization of heat extraction to provide and maintain a frozen barrier with condensation of the refrigerant by use of the body of salt water as a coolant;

GENERAL DESCRIPTION

In carrying out the purpose of my invention as stated hereinbefore, it is necessary to locate a land area adjacent to the shore of a body of salt water such as an ocean shore area where the water permeable earth in such area has the necessary extent and permeability to carry a sufficient quantity of fresh water as a reservoir. Having located such an area infiltrated with salt water the location of an impervious earth floor under the water permeable area must be determined. Also the lateral and upland extent of the infiltrated water permeable earth must be outlined. Areas of various extent are known where the impervious floor and the overlying water permeable earth exists in a valley such that the necessary barrier can be relatively short.

Figure 5:
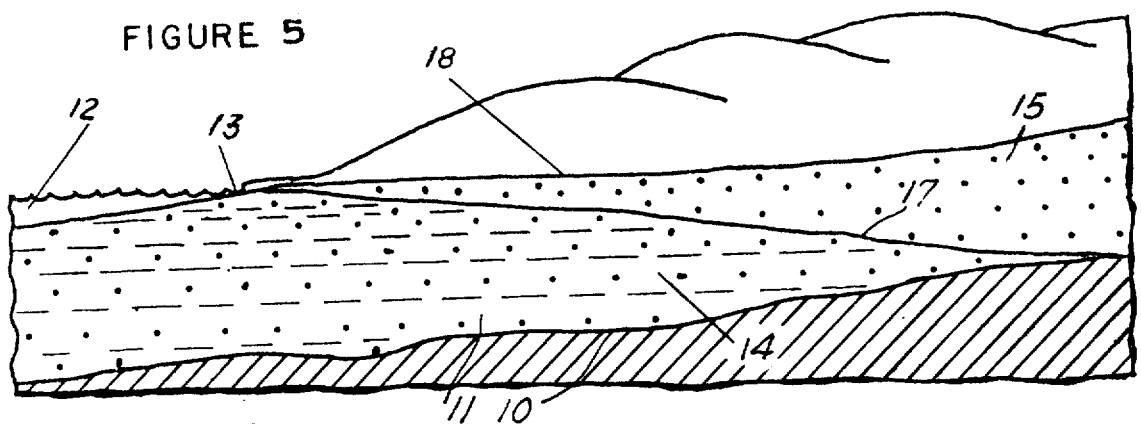
FIG. 5 is a diagrammatic sectional view through a shore line area at the edge of a body of salt water amenable to carrying out my process.
Figure 6:
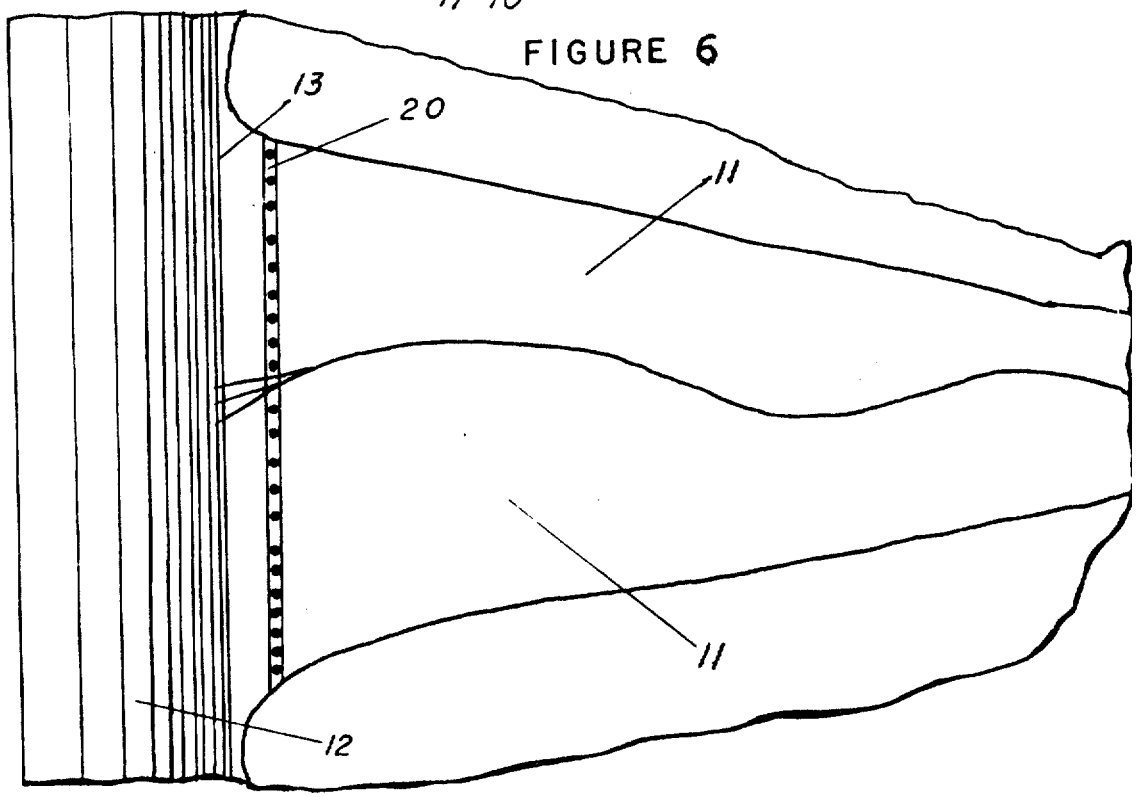
FIG. 6 is a plan view of the area shown in Fig. 5.
Figure 7:
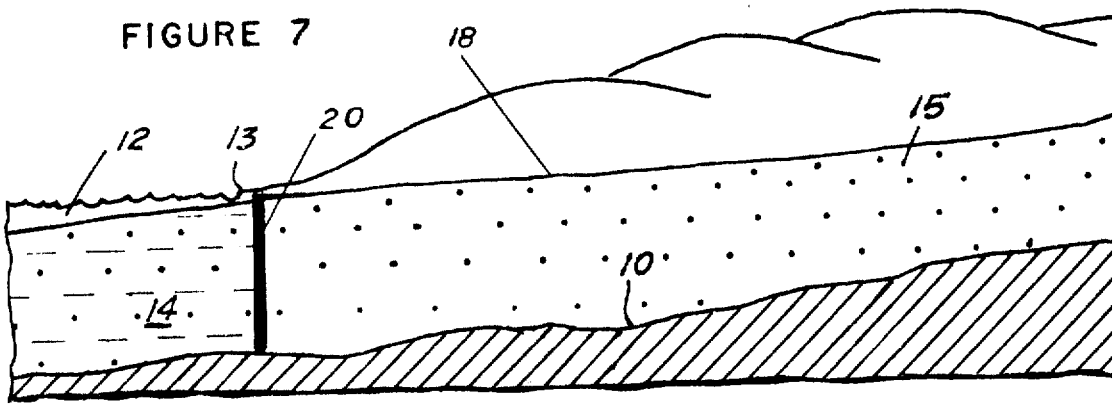
FIG. 7 is a view similar to Fig. 5 showing the area of Fig. 5 converted by my process into a storage reservoir for fresh water.

Referring now to Figs. 5-7 inclusive an area is shown wherein the water impervious floor is indicated at 10. Overlying this base there is a substantial layer 11 of water permeable earth made up largely of sand and gravel washed down from upland and extending out into the body 12 of salt water. Looking at the section view of Fig. 5 the infiltration of salt water inland of the shore line 13 is indicated at 14. The water permeable earth inland from the shore line 13 also is saturated with fresh water in the area 15. The line 17 indicates the natural line of demarcation between the lighter fresh water and the heavier salt water. The line 18 indicates the top surface of the water permeable earth 11. It is well known that the weight of the fresh water does push out the salt water and create the condition shown in Fig. 5. The U.S. Pat. to Dobell, No. 3,323,309, referred to hereinbefore on page 1, has a rather full description of this action. It is also discussed in a publication entitled—Water—The Yearbook of Agriculture 1955. Applicant's understanding is that, when the level of the top of fresh water in the water permeable earth is kept enough higher than the level of the top surface of the adjacent body of saline water to overcome the difference in specific gravity between the saline water and the fresh water, the interface between the fresh water and the saline water is depressed. Uniform recharge of fresh water from the inland watershed exerts a force against the salt water and creates the condition shown in Fig. 5. This known phenomenon is not claimed as any invention of applicant. It is also well known that along the meeting line 17 there is considerable intermingling and considerable shifting of the line as the opposing pressures between the salt water and fresh water vary in response to natural events such as rise and fall of the salt water level due to tides and storms and the rise and fall in infeed of fresh water due to dry and wet conditions upland.

According to the present method a water impervious barrier 20 is provided adjacent to the shore line 13 beginning at a height above the normal shore line equal to the high level of salt water intrusion over the water permeable earth layer 11. This barrier is extended down to the water impervious floor 10. The barrier 20 is extended along the shore and inland as far as is necessary to isolate the area of the layer 11 to be used for storage of fresh water from the intruding salt water. As soon as the barrier 20 is established, the salt water, inland from the barrier, is extracted by pumping it across the barrier into the body 12 of salt water. Preferably this extraction is done from near the bottom of the water permeable earth layer 11 and adjacent to the barrier 20. By doing this the pressure of the fresh water is used to push the salt water toward the barrier thus reducing the area 14 to substantially zero.

Assuming that the supply of fresh water from upland is adequate to replace the salt water removed a reservoir, indicated at 15a in Fig. 7, of fresh water can be accumulated on the shoreward side of the barrier 20 with substantially little water pressure differential between the two sides of the barrier at any time. The barrier 20, once formed, is buttressed on both faces by the earth itself and thus need not be of such strength as is required for reservoir dams that have the downstream face exposed to the air. This method of construction has additional advantages in its comparative safety from destruction by flood or by sabotage or enemy attack.

Any suitable known method of making the barrier 20 might be used. However, for certain advantages which will later appear, the process of forming and maintaining the barrier 20 about to be described is preferred. This process embodies utilizing a series of closely spaced holes 1 in the water permeable earth throughout the length of the barrier. These holes are extended down into the water impervious floor 10 and filled with a low freezing point liquid. Refrigerating tubing 2 is looped down through the holes 1 and supplied with refrigerant gas from any suitable source such as the feed line 4. Fig. 2 is a front sectional view of a portion of a drilled zone showing refrigeration tubing. The feed lines 3 and 4 from a refrigeration unit (not shown) are shown connected in series with U-shaped tubing 2 for circulating cold refrigerants through the series of holes in the drilled zone. During the freezing point liquid, or other materials to promote rapid heat transfer between the tubing and the drilled zone.

Fig. 3 is a plan view of a portion of a drilled zone showing parallel hookup of U-shaped tubing. A pressure difference maintained between refrigeration unit feed and return lines 5 (with or without individual flow adjustment at each U-shaped tube) may be used to control the flow of refrigerants through the zone to be frozen.

Fig. 4 is a sectional view across a portion of the drilled zone where parallel connections of the U-shaped refrigeration tubes have been installed. This view shows U-shaped tube 2 connected to larger refrigeration feed and return lines 5.

In making the holes and initiating the formation of the barrier 20, known methods of drilling the holes 1 can be employed. Usually the water permeable earth layer 11 is of such nature that the use of casings to prevent cave-in of the soil would be necessary. These casings can be left in place since they also form a confining wall for the law freezing temperature liquid that is employed in the holes. This liquid is used to improve the heat transfer from the water around the holes 1 to the refrigerant tubing 2. Once the holes 1 are provided in a portion of the barrier area the refrigeration can begin and it is carried on until the water between holes 1 and on both sides of the holes becomes frozen. When the water is frozen a barrier 20 is formed between the salt water body 12 and the inland area. Then the salt water inland of the barrier 20 is removed and discharged into the salt water body 12 until fresh water occupies all of the inland area 15.

In order to maintain a frozen barrier 20 it is essential, of course, to continue the circulation of the refrigerant in the holes 1 to maintain the barrier. Great strength is not necessary in such a barrier, however, because normally there is little pressure differential across the barrier. The barrier 20 thus can be much less massive than the above ground dams now provided for fresh water reservoirs of substantial depth. The frozen water barrier 20 naturally is lighter than the adjacent liquid on both sides since the specific gravity of ice is somewhat less than that of liquid water. However, the weight of the solids in the water permeable earth is such that the imprisoned earth particles in the ice is sufficient to overcome any tendency of the barrier 20 to rise.

This process of forming and maintaining the barrier 20 has a great advantage in that it is self-sealing if it is cracked by any sudden force such as an earth tremor. Even if the barrier 20 is cracked sufficiently to cause some mixing, across the barrier, of salt water with the fresh water, the salt water entering the inland fresh water reservoir may be removed in the same manner that the salt water originally inland of the barrier is removed, that is, by pumping it out.

Figure 9:
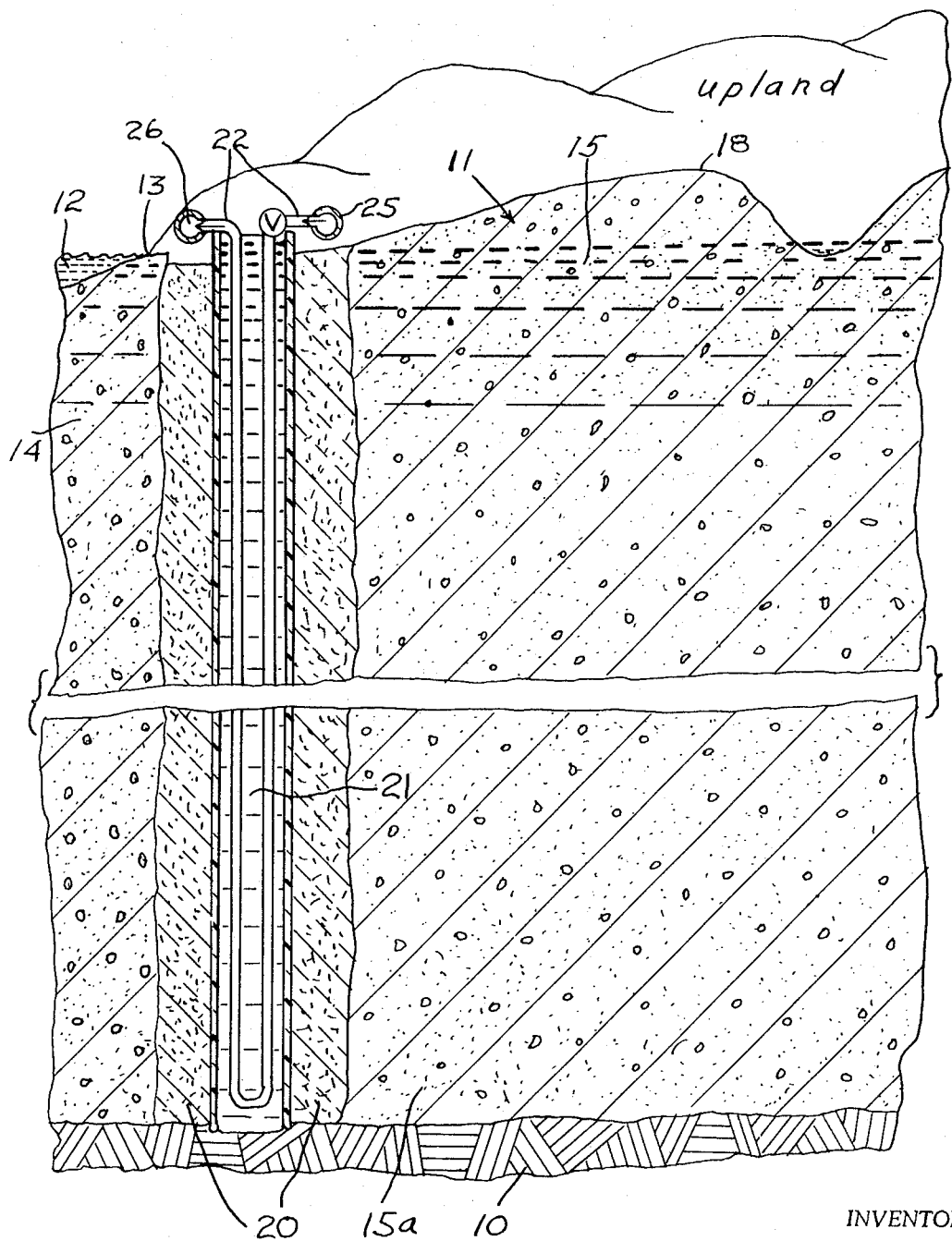
FIG. 9 is a somewhat diagrammatic sectional view showing the utilization of the heat extracted from the barrier to extract water vapor from the sea water and return it condensed to the fresh water reservoir.

The present invention utilizes the heat extracted from the water in forming and maintaining the barrier 20 to further the accumulation of fresh water in the reservoir area. As illustrated in Figs. 8 and 9 the barrier 20 receives its supply of refrigerant from a condenser 27. This condenser is cooled by salt water taken up from the salt water body 12. A compressor 28 feeds compressed refrigerant to the condenser 27 in the well-known system for recompressing refrigerant gas and condensing it for re-use as a refrigerant. The compressor draws the expanded refrigerant gas from the exhaust line 26 for the tubing 2 and the condenser delivers its condensed refrigerant to the supply line 25. The compressor 28 must also be cooled to maintain its efficiency and, according to the preferred process, the cooling of the compressor is done by salt water taken from the salt water body. The heat extracted from the refrigerant is thus made to raise the temperature of a substantial amount of salt water so that a considerable amount of water vapor can be taken from the salt water with very little or no additional heat. The water vapor is condensed in a vapor or steam condensing unit 29 and delivered by a conduit 30 to the fresh water side of the barrier 20. The use of the salt water for cooling the compressor and condensing the compressed refrigerant gas is thus made to reduce the cost of obtaining fresh water from salt water. The heated salt water can be sent to an evaporating unit separately heated thus avoiding the cost of bringing the salt water from normal atmospheric temperature upward to the temperature it acquires from the condenser 27 and compressor 28. This process is, however, complete upon capturing the water vapor from the coolant salt water used by the condenser and the compressor.

The present invention is applicable even where part of the water permeable earth area is below the level of the salt water body and may be covered by a pool of fresh water when the maximum storage capacity permitted by the barrier 20 is utilized. The invention is applicable also where the water permeable earth layer is all or in part covered by a water impervious layer of earth. Such a condition is found where lava flow has covered a water permeable layer that existed prior to the lava flow.

Having described my invention, I claim:

1. A process of restoring fresh water in water permeable earth adjacent to a body of salt water which comprises:
   a. establishing and maintaining a thin water impermeable barrier in the earth downward from the level of the high point of salt water intrusion over the permeable earth to a non-water-permeable earth layer and laterally along the shore and upland from the shore to points where the non-water-permeable earth layer is as high as the said level;
   b. extracting the saline water from the bottom portion of the permeable earth on the land side of said barrier and discharging the extracted saline water to the salt water body side of the barrier;
   c. supplying fresh water to the permeable earth from which the saline water is extracted thus replacing the saline water in the permeable earth with fresh water until the area occupied by the saline water shoreward from said barrier is filled with fresh water.

2. The process defined in claim 1 wherein the barrier is formed and maintained by continuously circulating refrigerant downwardly from the aforesaid level through the water permeable earth through a row of closely spaced holes to the non-water-permeable earth layer and lowering the temperature of the permeable earth between the holes and around them sufficiently to freeze the water in the adjacent permeable earth and keep it frozen.

3. The process defined in claim 1 wherein the earth on the land side of said barrier is raised above the top of the barrier to reduce the loss of fresh water by evaporation.

4. A process of collecting and storing fresh water in a water permeable earth layer which is naturally subjected to intrusion of salt water from an adjacent body of salt water and which layer is underlaid by a non-water-permeable permeable floor comprising;
   a. establishing by freezing in situ a thin water impermeable barrier in the earth layer that is filled with the salt water, extending said barrier downward from the level of the high point of salt water intrusion to the non-water-permeable floor;
   b. maintaining said barrier in frozen condition by continued extraction of heat therefrom;
   c. extracting the salt water from the water permeable earth layer on the inland side of the barrier and discharging it into the body of salt water;

d. supplying to the layer of water permeable earth adequate fresh water to replace the salt water withdrawn therefrom; and e. transferring the heat extracted from said barrier to salt water withdrawn from said body, vaporizing water from the withdrawn salt water and condensing the water vapor apart from the salt water to thus enhance the available fresh water.

5. The process defined in claim 4 wherein the heat extracted from the barrier is supplemented by heat generated in compressing and condensing a refrigerant which is recycled through the barrier and the transferred to salt water taken from said body of salt water.

6. The process defined in claim 1 wherein the barrier is formed and maintained by freezing in situ a narrow belt of the water permeable earth extending from the top of the layer of water permeable earth downward to the non-water-permeable floor.

* * * * *

UNITED STATES PATENT OFFICE
CERTIFICATE OF CORRECTION

Patent No. 3,640,074      Dated February 8, 1972

Inventor(s) Adolph Kipp, Jr.

It is certified that error appears in the above-identified patent and that said Letters Patent are hereby corrected as shown below:

Figures 5, 6 and 7 should read as shown on the attached sheet.

Column 3, line 15, after "freezing" to read ---process the cylindrical holes 1 would be filled with a low freezing----.

Column 3, line 34, "law" to read --- low ---.

Signed and Sealed this

First Day of March 1977

[SEAL]

Attest:

RUTH C. MASON
Attesting Officer

C. MARSHALL DANN
Commissioner of Patents and Trademarks